(No Model.)

M. A. CULVER.
PLOW AND DRAG ATTACHMENT.

No. 263,768. Patented Sept. 5, 1882.

Witnesses
E. B. Stocking
Jno. S. Slater

Moses A. Culver
Inventor

United States Patent Office.

MOSES A. CULVER, OF DAYTON, OHIO.

PLOW AND DRAG ATTACHMENT.

SPECIFICATION forming part of Letters Patent No. 263,768, dated September 5, 1882.

Application filed January 17, 1882. (No model.)

*To all whom it may concern:*

Be it known that I, MOSES A. CULVER, a citizen of the United States of America, residing at Dayton National Home, in the county of Montgomery and State of Ohio, have invented certain new and useful Improvements in Plow and Drag Attachments; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide an attachment for plows, drags, and other implements to which a team is usually attached without a pole, which attachment shall serve as a means to keep the traces and eveners from beneath the feet of the horses, and thereby prevent the horses from getting astride the traces when they are slack, as in turning about and backing; and my invention consists in certain means hereinafter described, and fully set forth in the claims.

Figure 1:
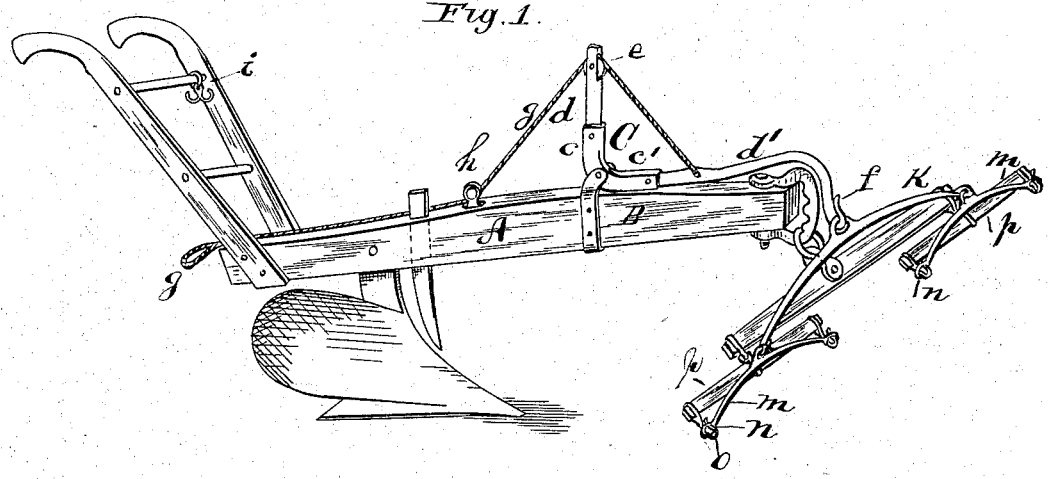
Figure 2:
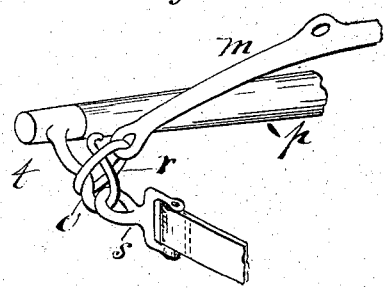

Figure 1 represents a plow provided with means embodying my invention, and Fig. 2 is a detail hereinafter described.

A represents the beam of a plow, to which by means of bolts I attach the brackets B for supporting the bell-crank C, which is pivotally secured to the bracket.

The bell-crank is preferably cast with hollow arms $c\ c'$, for the reception and retention of the extensions $d\ d'$, which may be of wood or iron, as desired. The former is slotted for the reception of a pulley, $e$, pivotally secured therein, and the latter is extended over and below the clevis of the plow, and terminates in a hook, $f$, which supports the double sling $k$, to which is attached at each end a single sling, $m$, each of which terminates at both ends in rings $n$, adapted to slip over the trace-hooks $o$ of the single-trees $p$, which are connected to an evener, as shown.

To the longer arm or extension of the bell-crank is attached a cord or wire rope, $g$, which passes through the slot in arm $d$ and over the pulley therein, and under pulley $h$, secured in the top of the plow-beam, and from thence extends backward to the handles and terminates in a loop adapted to be secured to the hook $i$ on the upper round of the handle.

Instead of a ring integral with the slings $m$, an additional safety-ring may be attached, as seen in Fig. 2, and the trace-hook of the configuration shown, so that in either construction after the trace-loop $s$ has been hooked the safety-ring secures it from becoming unhooked when the traces are slack.

The operation is as follows: In turning at the end of a furrow the rope $g$ is drawn and fastened to the hook $i$, which action depresses the arm $d$ and elevates the arm $d'$ and the attached slings, which in turn elevate the evener and single-trees and traces, thus preventing the team from treading upon or getting astride them.

The devices herein shown and described are readily detached, and can be applied to a harrow, drag, or any other implement of the same class, and will secure the desired result in as simple and efficacious manner as when applied to a plow, and the simplicity of their construction renders them readily attachable by persons not skilled mechanics, thus facilitating their use on different implements.

If desired, the arm $d'$ may be not curved, but straight, and it may be connected by a chain to the double sling $k$.

These devices may be attached to a drag upon one of its beams; or an additional beam may be laid diagonally thereon, when required, and in sections agreeing with the sections of the drag in extent or length, whereby the flexibility of the drag is not destroyed.

The bracket may extend below the beam and be provided with bolt-holes above and below the beam, whereby it may be attached by bolts passing over and under the beam, and not through it, as shown.

Having described my invention, what I claim as new, and desire to secure by Letters Patent, is—

1. The combination of the trace-hooks $o$ and slings $m$, provided with rings $n$, double sling $k$, and means for raising the same, all substantially as shown and described.

2. The combination of the slings $m\ m\ k$, arm $d'$, bell-crank C, arm $d$, and rope $g$ with the beam A, substantially as shown and described.

In testimony whereof I have affixed my signature in presence of two witnesses.

MOSES AARON CULVER.

Witnesses:
H. H. WAYMAN,
ALVA H. DOAN.